(12) United States Patent
Urano (10) Patent No.: US 8,277,240 B2
(45) Date of Patent: Oct. 2, 2012

(54) CONNECTOR FOR BACKLIGHT AND HAVING A MEMBER RESTRICTING MOVEMENT OF ANOTHER MEMBER

(75) Inventor: Tetsu Urano, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 262 days.

(21) Appl. No.: 12/661,791

(22) Filed: Mar. 24, 2010

(65) Prior Publication Data
US 2010/0255685 A1   Oct. 7, 2010

(30) Foreign Application Priority Data

Apr. 7, 2009  (JP) ................................. 2009-093204

(51) Int. Cl.
*H01R 33/02* (2006.01)
(52) U.S. Cl. ........ 439/232; 439/239; 439/682; 439/698; 439/857
(58) Field of Classification Search .................. 439/232, 439/235, 239, 682, 698, 857
See application file for complete search history.

(56) References Cited

U.S. PATENT DOCUMENTS

| 7,503,786 B2 | 3/2009 | Kato et al. | |
| 7,527,510 B2 * | 5/2009 | Yoo | 439/232 |
| 7,740,511 B2 * | 6/2010 | Katano | 439/816 |
| 2008/0090473 A1 * | 4/2008 | Katano | 439/816 |

FOREIGN PATENT DOCUMENTS

| JP | 2007-095672 | 4/2007 |
| JP | 2008-034330 | 2/2008 |
| KR | 2008-0033860 | 4/2008 |

OTHER PUBLICATIONS

Korean Office Action dated Jul. 28, 2011 in Korean Patent Application No. 2010-0031409 along with an English translation of same.

* cited by examiner

*Primary Examiner* — Tho D Ta
(74) *Attorney, Agent, or Firm* — Collard & Roe, P.C.

(57) ABSTRACT

A connector has a first member connectable to a first object and a second member connectable to a second object. The second member is arranged so as to restrict movement of the first member in a first horizontal direction. The connector also has a connection member configured to connect the first member and the second member to each other so that the first member is movable relative to the second member in a second horizontal direction perpendicular to the first horizontal direction.

10 Claims, 7 Drawing Sheets

CONNECTOR FOR BACKLIGHT AND HAVING A MEMBER RESTRICTING MOVEMENT OF ANOTHER MEMBER

CROSS REFERENCE TO RELATED APPLICATIONS

Applicant claims priority under 35 U.S.C. §119 of Japanese Patent Application No. JP2009-093204 filed on Apr. 7, 2009.

BACKGROUND OF THE INVENTION

The present invention relates to a connector for a backlight in a liquid crystal panel, a monitor, or the like.

For example, this type of connector is disclosed in JP-A 2008-34330, the contents of which are incorporated herein by reference. In the connector disclosed in JP-A 2008-34330, unexpected stress may be applied to a portion connected to a circuit board (e.g., a solder portion) due to thermal contraction or thermal expansion of a cold cathode fluorescent lamp (CCFL) or the like that is held by the connector.

Meanwhile, in a case of a connector disclosed in JP-A 2007-95672, even if thermal contraction or thermal expansion of a CCFL or the like occurs, the flexibility of contacts absorbs such thermal contraction or thermal expansion. Therefore, there is no problem that stress is concentrated at a solder portion or the like.

However, in the connector disclosed in JP-A 2007-95672, contacting areas of the contacts (portions supporting the CCFL or the like) have excessively high flexibility of movement. Therefore, the connector cannot be formed only by the contacts, and a housing is required separately from the contacts. Assuming that a housing is removed from the connector disclosed in JP-A 2007-95672, the strength of the connector is too weak. In other words, the number of parts is increased in order to maintain the strength with the structure disclosed in JP-A 2007-95672.

SUMMARY OF THE INVENTION

It is, therefore, an object of the present invention to provide a connector capable of avoiding problems caused by thermal contraction or thermal expansion of a CCFL or the like with a technique different than that disclosed in JP-A 2007-95672.

One aspect of the present invention provides a connector having a first member connectable to a first object and a second member connectable to a second object. The second member is arranged so as to restrict movement of the first member in a first horizontal direction. The connector also has a connection member configured to connect the first member and the second member to each other so that the first member is movable relative to the second member in a second horizontal direction perpendicular to the first horizontal direction.

An appreciation of the objectives of the present invention and a more complete understanding of its structure may be had by studying the following description of the preferred embodiment and by referring to the accompanying drawings.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DESCRIPTION OF PREFERRED EMBODIMENTS

Figure 1:
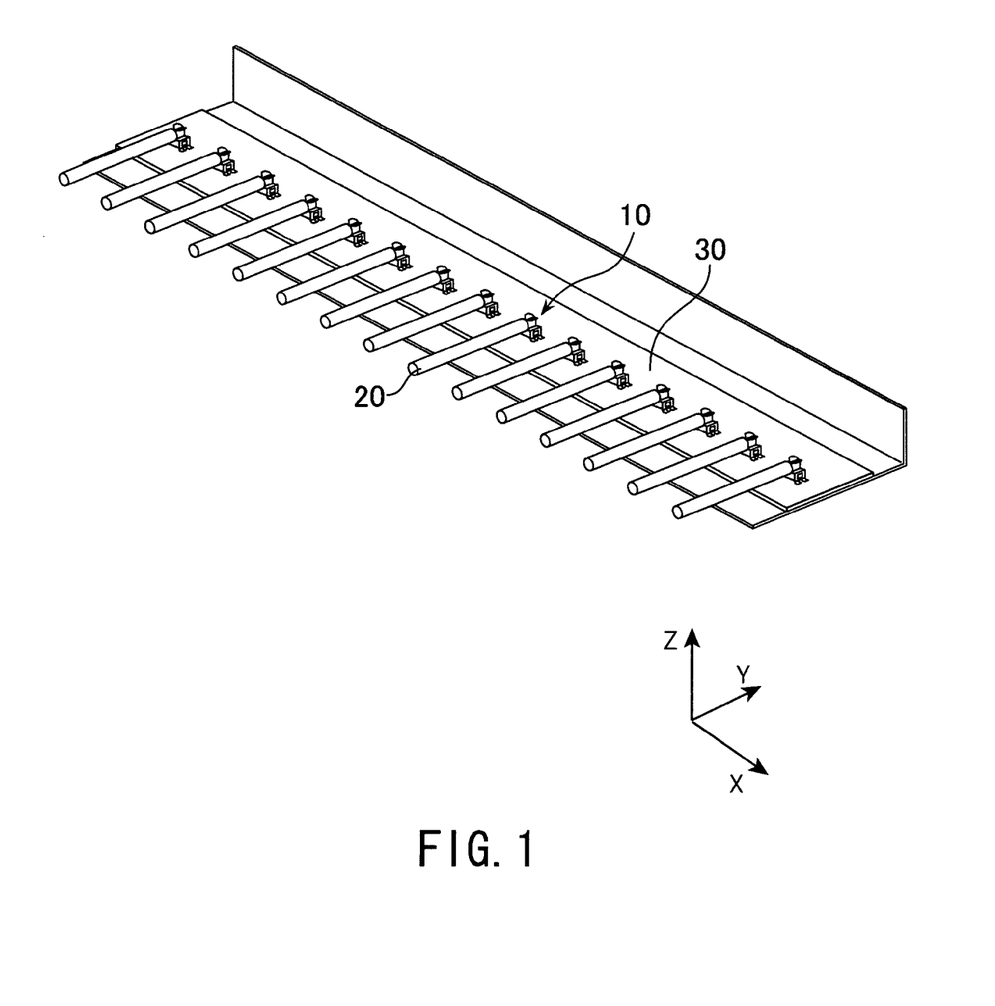
FIG. 1 is a perspective view showing a mounted state of a connector according to an embodiment of the present invention, in which only part of cold cathode fluorescent lamps and a circuit board is illustrated.
Figure 2:
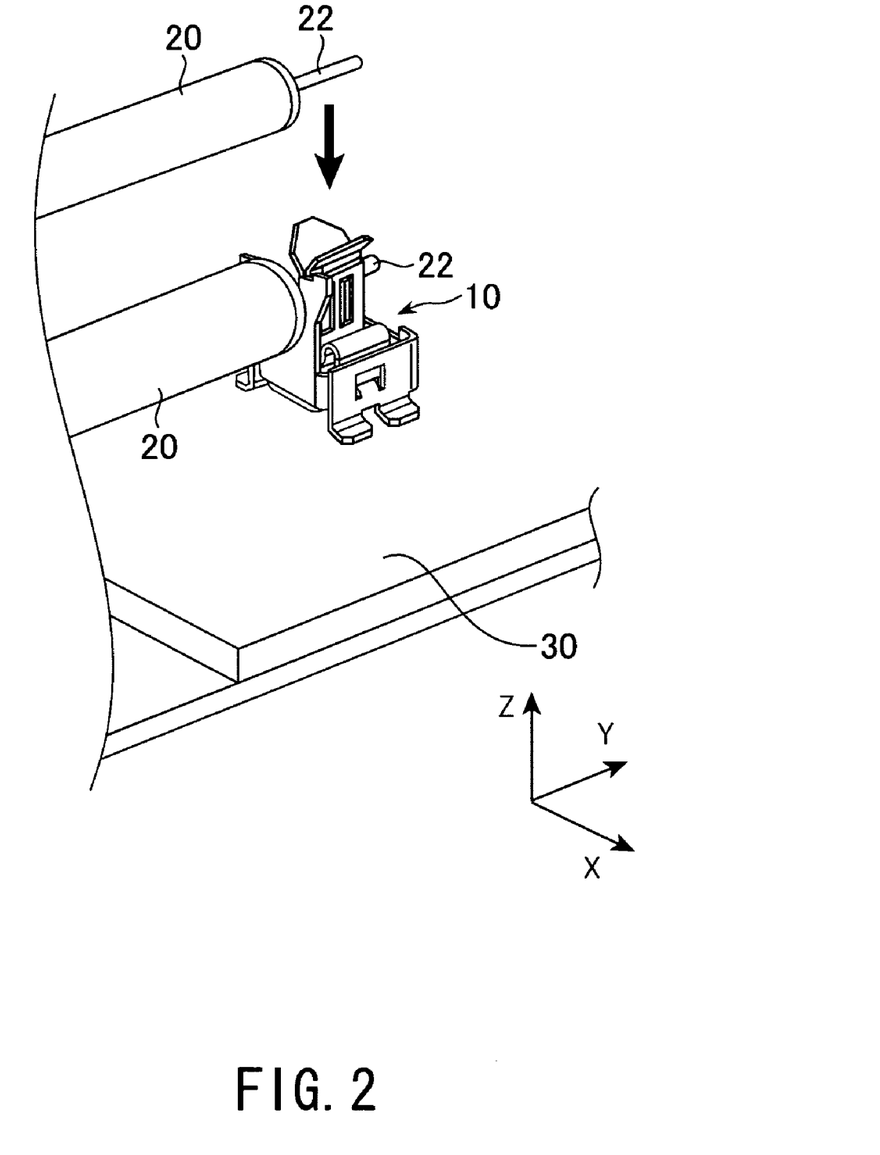
FIG. 2 is an enlarged view of the connector shown in FIG. 1.

As shown in FIGS. 1 and 2, a connector 10 according to an embodiment of the present invention is used to connect a cold cathode fluorescent lamp 20 and a circuit board 30 to each other. In FIG. 1, the cold cathode fluorescent lamps 20 and the circuit board 30 are illustrated only with their connecting portions to the connector 10.

As shown in FIGS. 2 to 4 and FIG. 10, the connector 10 according to the present embodiment has a first member (first section) 100, a second member (second section) 200, and a connection member (connection section) 300. The first member 100 is connected to a cold cathode fluorescent lamp 20, and the second member 200 is connected to the circuit board 30. The connection member 300 connects the first member 100 and the second member 200 to each other. The first member 100, the second member 200, and the connection member 300 of the present embodiment are formed integrally by pressing or the like.

The first member 100 includes a holder 110 for holding a terminal 22 of the cold cathode fluorescent lamp 20, a support 120 for defining the bottom dead center of the cold cathode fluorescent lamp 20 (the lowermost position of the cold cathode fluorescent lamp 20 in the Z-direction), and a base 130 connecting the holder 110 and the support 120 to each other.

The holder 110 is formed by a pair of spring portions 111a and 111b, which partially contact each other in the X-direction. The spring portions 111a and 111b include tip potions 112a and 112b, detachment prevention portions 113a and 113b produced by making an incision in part of the spring portions 111a and 111b and then bending the incised portion downward in the Z-direction, protrusions 115a and 115b projecting so as to separate from each other in the X-direction, and bent portions 116a and 116b.

Figure 3:
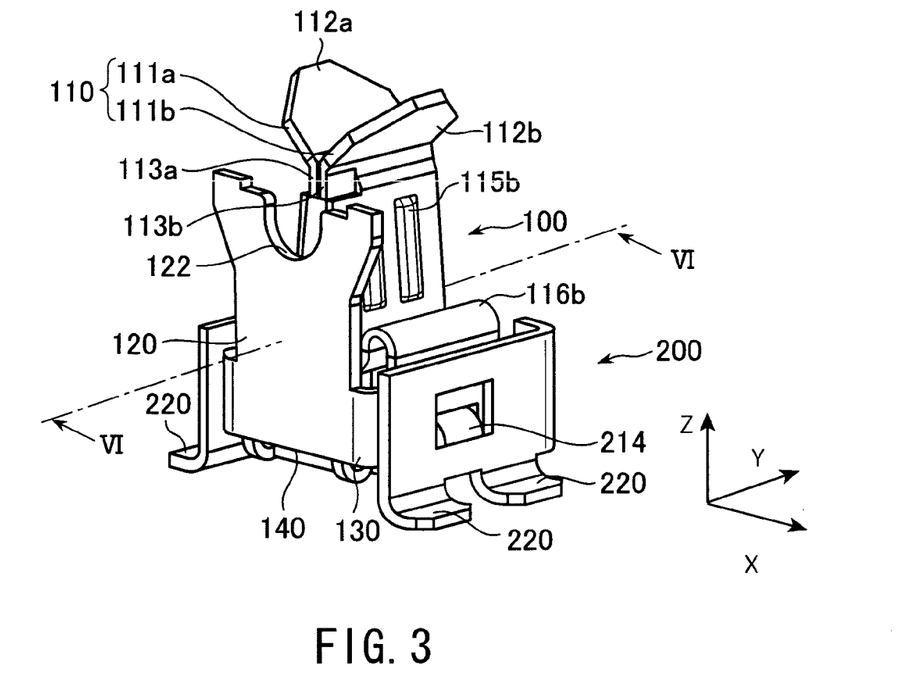
FIG. 3 is a perspective view of the connector shown in FIG. 2 as viewed from above a front side of the connector.
Figure 4:
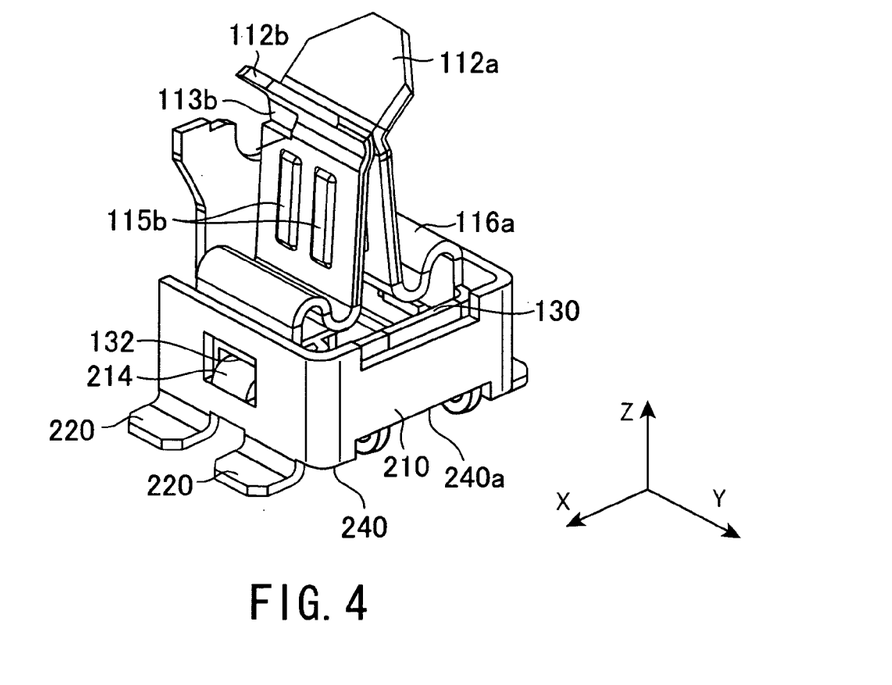
FIG. 4 is a perspective view of the connector shown in FIG. 2 as viewed from above a rear side of the connector.

Preloads are applied to the spring portions 111a and 111b so that the spring portions 111a and 111b push against each other in the X-direction under the normal conditions shown in FIGS. 3 and 4. In the present embodiment, the terminal 22 of the cold cathode fluorescent lamp 20 is passed between the detachment prevention portions 113a and 113b downward in the Z-direction and then held by the holder 110.

The tip portions 112a and 112b are bent so as to extend upward in the Z-direction and separate from each other in the X-direction. The tip portions 112a and 112b serve to guide the terminal 22 of the cold cathode fluorescent lamp 20.

The detachment prevention portions 113a and 113b extend downward in the Z-direction from contacts of the spring portions 111a and 111b and contact each other without any space. Thus, even if the terminal 22 of the cold cathode fluorescent lamp 20 held by the holder 110 moves upward in the Z-direction, it strikes lower ends of the detachment prevention portions 113a and 113b. Therefore, the terminal 22 is prevented from being detached upward in the Z-direction from the holder 110.

The bent portions 116a and 116b are produced by bending the spring portions 111a and 111b so as to curve downward in the Z-direction and then bending the spring portions 111a and 111b so as to curve upward in the Z-direction. As a result, each of the bent portions 116a and 116b has an S-shaped cross-section on the XZ-plane as can be seen from FIG. 5.

Figure 5:
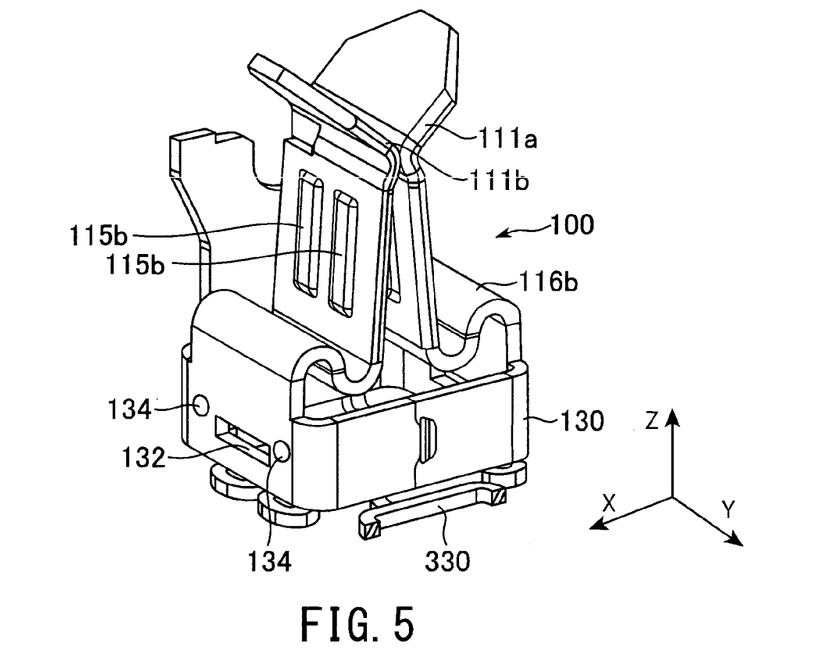
FIG. 5 is another perspective view of the connector shown in FIG. 4 as viewed from above the rear side of the connector, in which a second member is omitted from the illustration.
Figure 6:
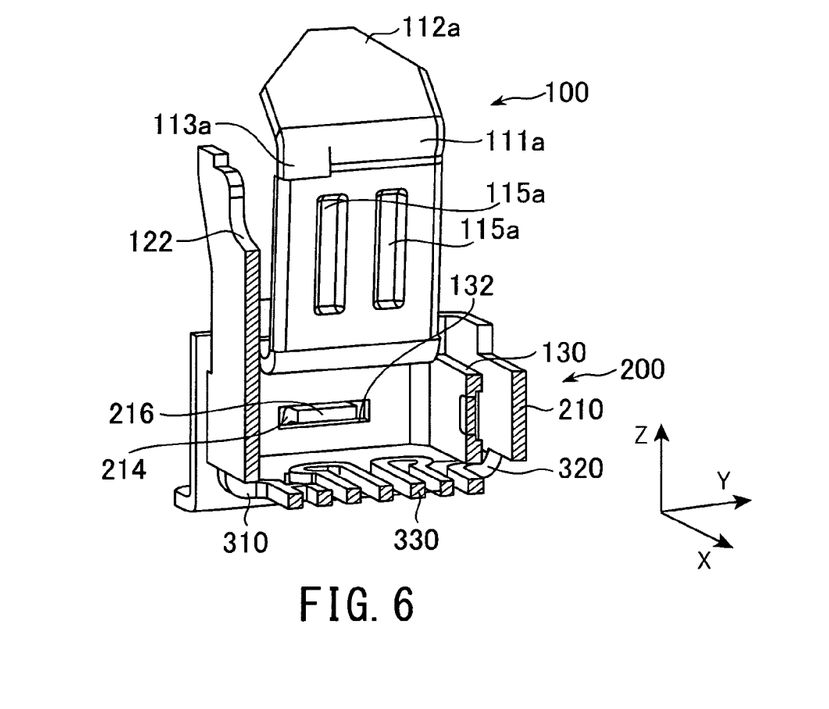
FIG. 6 is a sectional view of the connector shown in FIG. 3 which is cut by the YZ-plane passing line VI-VI.

As shown in FIGS. 5 and 6, each of the protrusions 115a and 115b projects outward in the X-direction. This arrangement can reduce contact areas between the spring portions 111a and 111b and the terminal 22 of the cold cathode fluorescent lamp 20 as shown in FIG. 2 and can thus prevent wear due to movement of the terminal 22.

As shown in FIGS. 3 and 4, the support 120 has a U-shaped edge 122 formed for supporting the terminal 22 of the cold cathode fluorescent lamp 20. The U-shaped edge 122 defines the bottom dead center of the terminal 22.

The base 130 has a roughly rectangular shape as viewed downward in the Z-direction. The bent portions 116a and 116b of the holder 110 extend from side surfaces of the base 130 facing each other in the X-direction, which is hereinafter referred to as X-side surfaces. The support 120 extends upward from a front side surface of the base 130 in the Y-direction. As shown in FIG. 5, the base 130 has guide portions 132 formed respectively in the X-side surfaces. In the present embodiment, each of the guide portions 132 is formed by a slit extending in the Y-direction.

Protrusions 134 are formed near opposite ends of each guide portion 132 in the Y-direction. Each of the protrusions 134 projects along the X-direction from the side surface. The first member 100 is connected to the connection member 300, which will be described later, via a lower edge 140 of the base 130.

As shown in FIGS. 3 and 4, the second member 200 includes an outer frame 210 and fixing portions 220 extending from the outer frame 210. The outer frame 210 is formed so as to surround three side surfaces of the base 130 of the first member 100 other than the front surface of the base 130 in the Y-direction. The fixing portions 220 extend from lower portions of the X-side surfaces of the base 130 so as to separate from each other in the X-direction. The fixing portions 220 are electrically connected to a circuit (not shown) of the circuit board 30 (see FIG. 2). Furthermore, the outer frame 210 has a lower edge 240 with a recessed portion 240a, which is recessed partially in the Z-direction. The second member 200 is connected to the connection member 300, which will be described later, via the recessed portion 240a. The lower edge 140 of the first member 100 is located at the same height in the Z-direction as the recessed portion 240a of the second member 200.

As shown in FIGS. 4 and 5, the protrusions 134 formed on the base 130 of the first member 100 are provided in order to reduce clearances in the X-direction between the base 130 and the outer frame 210 of the second member 200. Thus, the protrusions 134 abut the second member 200. With this configuration, movement of the first member 100 is restricted relative to the second member 200 in the X-direction.

In the present embodiment, the second member 200 has regulation portions 214 formed on both side surfaces in the X-direction. Each of the regulation portions 214 includes a portion extending upward and a portion extending toward the first member 100. As can be seen from FIG. 6, each of the regulation portions 214 has an end 216 received within the corresponding guide portion 132. In the present embodiment, the end 216 of each regulation portion 214 has a Y-direction width smaller than that of the corresponding guide portion 132. With this configuration, the end 216 can move in the Y-direction within a range of the Y-direction width of the guide portion 132. Meanwhile, the Z-direction thickness of the end 216 of each regulation portion 214 is slightly smaller than the Z-direction height of the corresponding guide portion 132. Thus, the end 216 can hardly move in the Z-direction within the guide portion 132. With this arrangement, the first member 100 can move within a certain range in the Y-direction relative to the second member 200 and can hardly move in the Z-direction.

Figure 7:
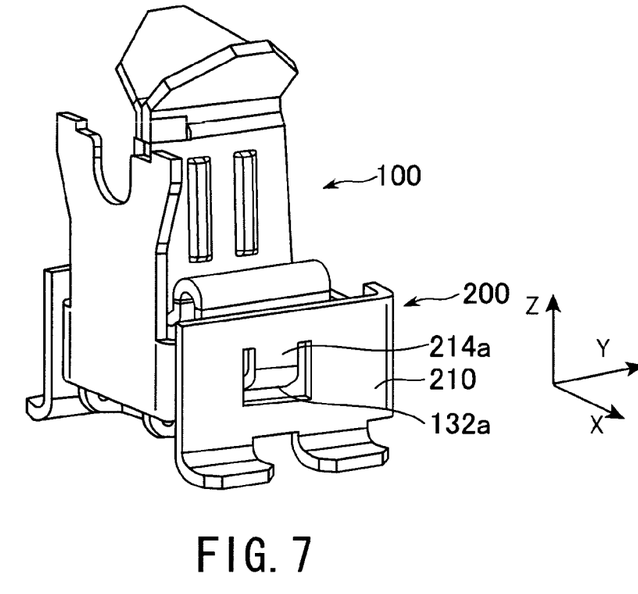
FIG. 7 is a perspective view showing a variation of a regulation portion of a base according to the embodiment of the present invention.
Figure 8:
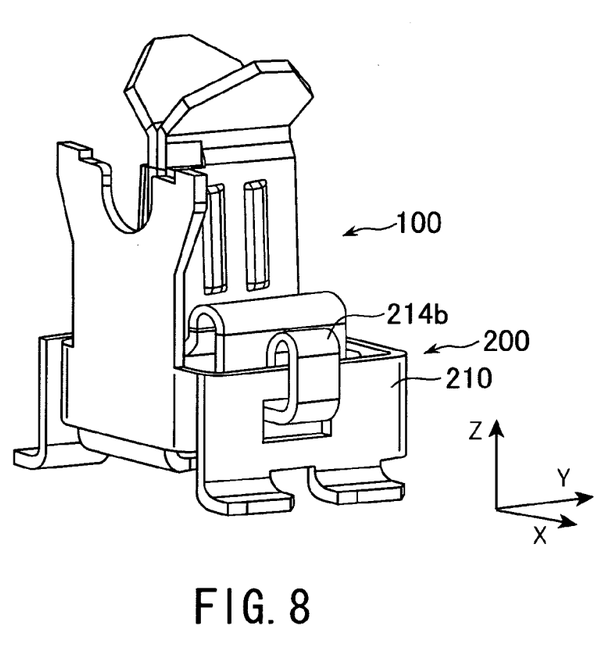
FIG. 8 is another perspective view showing a variation of the regulation portion of the base according to the embodiment of the present invention.
Figure 9:
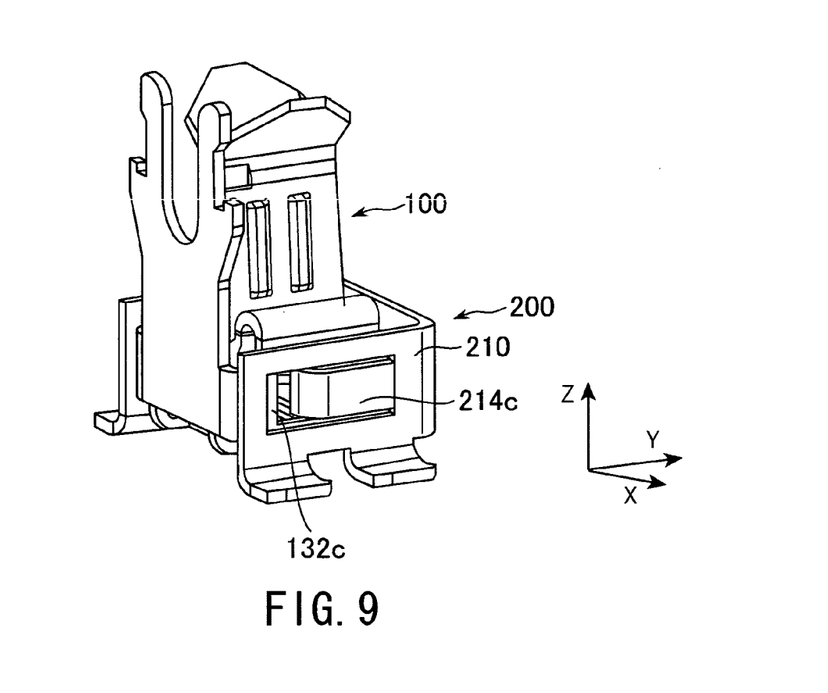
FIG. 9 is another perspective view showing a variation of the regulation portion of the base according to the embodiment of the present invention.

The guide portions 132 and the regulation portions 214 are not limited to the aforementioned structures. For example, as shown in FIG. 7, regulation portions 214a may be configured such that the regulation portions 214 shown FIG. 4 are turned upside down. Specifically, each regulation portion 214a may be formed so as to have a portion extending downward and a portion extending toward the first member 100. Furthermore, as shown in FIG. 8, part of upper edges of the outer frame 210 may be extended so as to form regulation portions 214b. Alternatively, as shown in FIG. 9, each regulation portion 214c may be formed so as to have a portion extending frontward in the Y-direction and a portion extending toward the first member 100. In any case of FIGS. 7 to 9, the first member 100 is arranged such that the first member 100 can move within a certain range in the Y-direction relative to the second member 200 and can hardly move in the Z-direction. The structures of the guide portions and the regulation portions are not limited to the aforementioned structures as long as they regulate movement of the first member 100 as described above.

Figure 10:
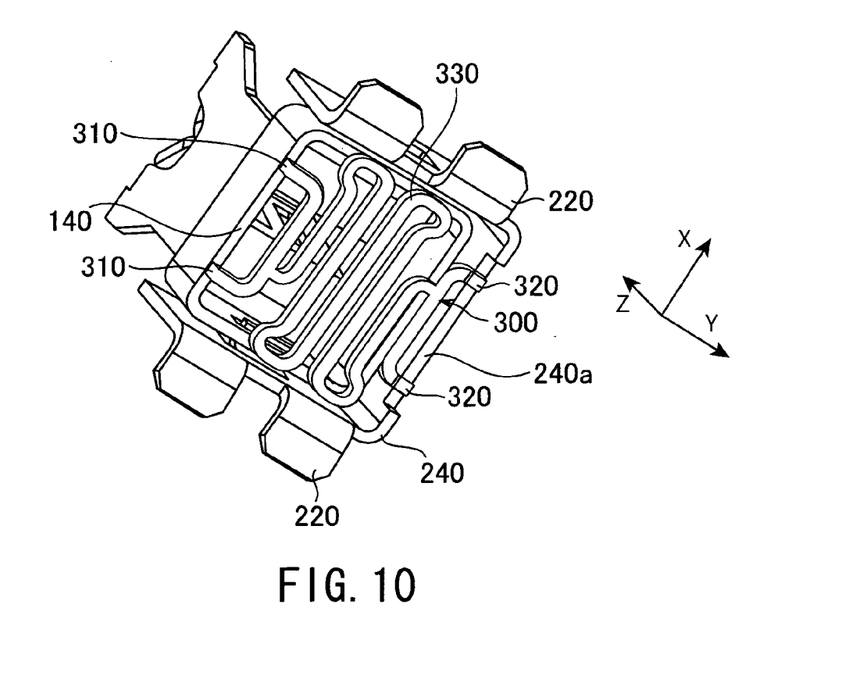
FIG. 10 is a perspective view of the connector shown in FIG. 2 as viewed from below the connector.

As shown in FIGS. 3 and 10, the connection member 300 includes first connection ends 310 connected to the first member 100, second connection ends 320 connected to the second member 200, and a meander portion 330 connecting the first connection ends 310 and the second connection ends 320 to each other. The meander portion 330 is formed so as to be expandable and contractible in the Y-direction. Thus, as shown in FIG. 2, the first member 100 is supported in a floating state via the connection member 300 by the second member 200 fixed to the circuit board 20. Considering this structure of the connection member 300, the aforementioned operations of the guide portions 132 and the regulation portions 214 (see FIG. 6), and the role of the protrusions 134 (FIG. 5), the first member 100 to which the cold cathode fluorescent lamp 20 is connected is movable within a certain range in the Y-direction (the direction in which the cold cathode fluorescent lamp 20 expands or contracts) relative to the second member 200 connected and fixed to the circuit board 30. Meanwhile, movement of the first member 100 is restricted relative to the second member 200 in the X-direction and the Z-direction, so that the first member 100 can hardly move in the X-direction and the Z-direction. This arrangement can absorb thermal expansion and thermal contraction of the cold cathode fluorescent lamp 20 in the Y-direction. Therefore, the connector 10 according to the present embodiment does not suffer from any problem caused by thermal expansion and thermal contraction of the cold cathode fluorescent lamp 20.

In the present embodiment, the first connection ends 310 and the second connection ends 320 are connected to the lower edge 140 of the first member 100 and the lower edge 240 of the second member 200, respectively, at two locations as shown in FIG. 10. With this configuration, the strength can be enhanced against stress applied to the first connection ends 310 and the second connection ends 320 during a pressing process. Moreover, the first member 100, the second member 200, and the connection member 300 can be stabilized without distortion by the connections at two locations. Furthermore, one meander portion 330 is provided to connect between the first connection ends 310 and the second connection ends 320. This configuration increases the spring length of the meander portion 330, thereby providing high spring characteristics.

Figure 11:
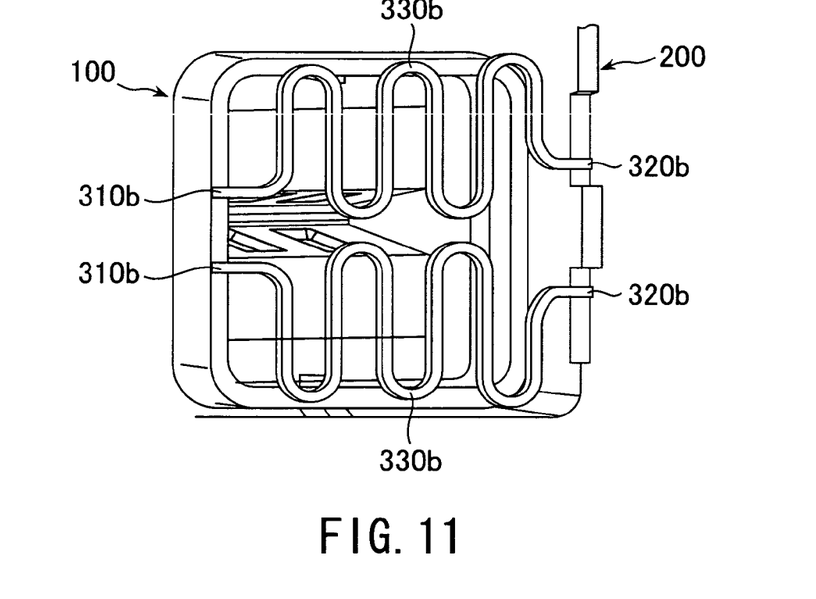
FIG. 11 is an enlarged perspective view showing a variation of a meander portion according to the embodiment of the present invention.
Figure 12:
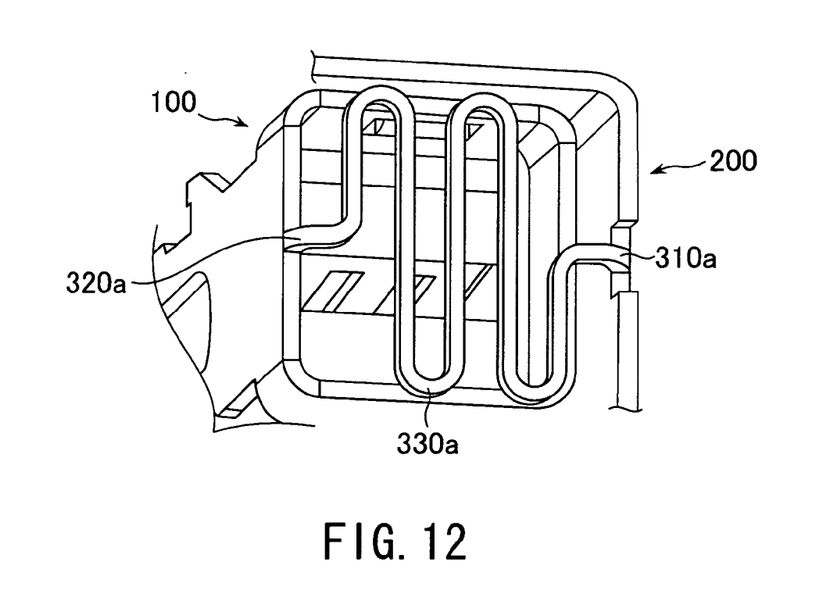
FIG. 12 is another enlarged perspective view showing a variation of the meander portion according to the embodiment of the present invention.

In order to enhance the strength and the spring characteristics of the connection member 300, the connection member 300 of the present embodiment is arranged as described above. However, the connection member 300 may be configured to enhance only one of the strength and the spring characteristics of the connection member 300. For example, as shown in FIG. 11, one first connection end 310a and one second connection end 320a may be connected to the lower edge 140 of the first member 100 and the lower edge 240 of the second member 200, respectively. This configuration can increase the spring length of a meander portion 330a. However, the first member 100 may twist relative to the second member 200 on the XZ-plane. Alternatively, as shown in FIG. 12, two meander portions 330b each including a first connection end 310b and a second connection end 320b may be used to form two springs. With this configuration, the first member 100 and the second member 200 are connected to the connection member 300 at two locations. Therefore, the stability can be enhanced as with the meander portion 330 shown in FIG. 10. However, since two springs are used, the spring length of each spring cannot be increased as compared to the meander portion 330 shown in FIG. 10. Accordingly, it is preferable to use the connection member 330 as shown in FIG. 10 in order to achieve improvement of both of the stability and high spring characteristics.

According to the present invention, two members are connected to each other in such a manner that the member connected to one connection target, such as a CCFL, is movable relative to the member connected and fixed to another connection target, such as a circuit board. Therefore, thermal contraction of the CCFL can be absorbed by relative movement between the two members. Accordingly, a connector according to the present invention does not suffer from any problem caused by thermal contraction.

The present application is based on a Japanese patent application of JP2009-093204 filed before the Japan Patent Office on Apr. 7, 2009, the contents of which are incorporated herein by reference.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A connector comprising:
    a first member connectable to a first object;
    a second member connectable to a second object, the second member being arranged so as to restrict movement of the first member in a first horizontal direction; and
    a connection member configured to connect the first member and the second member to each other so that the first member is movable relative to the second member in a second horizontal direction perpendicular to the first horizontal direction.

2. The connector as recited in claim 1, wherein the second member is configured to surround three sides of the first member as viewed along a vertical direction perpendicular to the first horizontal direction and the second horizontal direction.

3. The connector as recited in claim 1, wherein the first member, the second member, and the connection member are integrally formed.

4. The connector as recited in claim 1, wherein the connection member includes at least one meander portion having spring characteristics based on its meander shape, the at least one meander portion being connected to a lower portion of the first member and a lower portion of the second member.

5. The connector as recited in claim 4, wherein the connection member further includes:
    at least two first connection ends connected to the lower portion of the first member, and
    at least two second connection ends connected to the lower portion of the second member, the at least one meander portion connecting the at least two first connection ends and the at least two second connection ends to each other.

6. The connector as recited in claim 1, wherein the second member includes a regulation portion, and
    the first member includes a guide portion configured to guide the regulation portion so as to regulate movement of the first member relative to the second member in two directions of the first horizontal direction and a vertical direction perpendicular to the first horizontal direction and the second horizontal direction.

7. The connector as recited in claim 6, wherein the guide portion is a slit formed in the first member so as to extend in the second horizontal direction, and
    the regulation portion is formed by bending part of the second member and has an end received within the slit.

8. The connector as recited in claim 1, wherein at least one of the first member and the second member includes a protrusion formed so as to provide contact between the first member and the second member.

9. The connector as recited in claim 1, wherein one of the first object and the second object is a cold cathode fluorescent lamp, and another of the first object and the second object is a circuit board.

10. The connector as recited in claim 9, wherein one of the first member and the second member is fixed to the circuit board, and another of the first member and the second member is supported in a floating state via the connection member by the one of the first member and the second member.

* * * * *